(12) United States Patent
Cecil

(10) Patent No.: US 11,507,557 B2
(45) Date of Patent: Nov. 22, 2022

(54) DYNAMIC SAMPLING OF STREAMING DATA USING FINITE MEMORY

(71) Applicant: INTERNATIONAL BUSINESS MACHINES CORPORATION, Armonk, NY (US)

(72) Inventor: Roy Robert Cecil, Lisbon (PT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/220,952

(22) Filed: Apr. 2, 2021

(65) Prior Publication Data

US 2022/0318225 A1 Oct. 6, 2022

(51) Int. Cl.
*G06F 16/23* (2019.01)
*G06F 16/22* (2019.01)

(52) U.S. Cl.
CPC .......... *G06F 16/23* (2019.01); *G06F 16/2228* (2019.01); *G06F 16/2282* (2019.01)

(58) Field of Classification Search
CPC ...................................................... G06F 16/23
USPC ...................................................... 707/791
See application file for complete search history.

(56) References Cited

U.S. PATENT DOCUMENTS

| 8,392,381 | B2 | 3/2013 | Al-Kateb | |
|---|---|---|---|---|
| 10,180,339 | B1 * | 1/2019 | Long | G06N 20/00 |
| 2006/0235992 | A1 * | 10/2006 | Matias | H04L 65/607 |
| | | | | 709/236 |
| 2008/0215546 | A1 * | 9/2008 | Baum | G06F 16/2272 |
| 2011/0313977 | A1 | 12/2011 | Al-Kateb et al. | |
| 2012/0173592 | A1 | 7/2012 | Aharoni | |
| 2016/0292233 | A1 | 10/2016 | Wilkinson | |
| 2019/0345651 | A1 | 11/2019 | Liang | |
| 2020/0125627 | A1 | 4/2020 | Küster | |

FOREIGN PATENT DOCUMENTS

CN 102651020 A 8/2012

OTHER PUBLICATIONS

Mell et al., "The NIST Definition of Cloud Computing", National Institute of Standards and Technology, Special Publication 800-145, Sep. 2011, 7 pages.
International Searching Authority, "Notification of Transmittal of the international Search Report and the Written Opinion of the International Searching Authority, or Declaration," Patent Cooperation Treaty, Jun. 27, 2022, 9 pages, International Application No. PCT/CN2022/084756.

\* cited by examiner

*Primary Examiner* — Syling Yen
(74) *Attorney, Agent, or Firm* — Robert R. Aragona

(57) ABSTRACT

Method and system are provided for dynamic sampling of streaming data using finite memory. The method includes configuring a number of data points required in a sample of incoming streaming data and providing memory slots in a memory reservoir for the number of data points, with the memory slots each configured to store a position index and signal data pair for a data point, and each memory slot having a filtering thread configured to determine whether an index and signal data pair of the incoming streaming data should be stored in the memory slot. The filtering threads are configured to dynamically repopulate the memory slots for the number of data points with index and signal data pairs at increasing arrival intervals in the stream of streaming data as the incoming streaming data arrives.

20 Claims, 11 Drawing Sheets

DYNAMIC SAMPLING OF STREAMING DATA USING FINITE MEMORY

BACKGROUND

The present invention relates to analysis of streaming data, and more specifically, to dynamic sampling of streaming data using finite memory.

Streaming data examples occur in many situations; for example, temperature data from sensors, vibration data from machinery, electric voltage from an electrocardiogram machine, etc. It is not possible to store every signal in the data stream for analysis as the amount of storage would have to be immense.

Data summaries of streaming data are often useful to express the behavior of the data stream. For example, the average temperature readings from a sensor, and therefore a representative sample of the data stream is required. To average the streaming data, the most popular approach used is the sliding window approach. In this approach, a window of a set number of measurements are taken which slides along the time axis as new measurements come in. At each discrete interval, the summary statistic for the data in the window is reported as a metric of interest in the data stream.

Another approach is to find equidistant points in the data stream starting from a given discrete time interval. For some cases (for example, for truly random signals) where the statistical summary needs to be smoothed to avoid random fluctuations, this is a useful approach.

For problems that need a set of random points to be maintained, this is done by keeping a reservoir of samples and replacing them randomly by bumping off a random value in the reservoir with a signal decided randomly every time a new signal is seen. The drawback with this method is that the statistical shape of a curve of the streaming data is lost and it is not possible to do any computation that requires the shape of the curve.

SUMMARY

According to an aspect of the present invention there is provided a computer-implemented method for dynamic sampling of streaming data using finite memory, comprising: configuring a number of data points required in a sample of incoming streaming data; and providing memory slots in a memory reservoir for the number of data points, with the memory slots each configured to store a position index and signal data pair for a data point, and each memory slot having a filtering thread configured to determine whether an index and signal data pair of the incoming streaming data should be stored in the memory slot; wherein the filtering threads are configured to dynamically repopulate the memory slots for the number of data points with index and signal data pairs at increasing arrival intervals in the stream of streaming data as the incoming streaming data arrives.

According to another aspect of the present invention there is provided a system for dynamic sampling of streaming data using finite memory, comprising: a processor and a memory configured to provide computer program instructions to the processor to execute the function of the components: a configuring component for configuring a number of data points required in a sample of incoming streaming data; and a memory reservoir for providing memory slots for the number of data points, with the memory slots each configured to store a position index and signal data pair for a data point; a thread component for providing a filtering thread for each memory slot, the filtering threads each having a filter configured to determine whether an index and signal data pair of the incoming streaming data should be stored in the memory slot; and a streaming data processing component for receiving the incoming streaming data and dynamically repopulating the memory slots for the number of data points with index and signal data pairs at increasing arrival intervals in the stream of streaming data by applying the filtering thread components.

According to a further aspect of the present invention there is provided computer program product for dynamic sampling of streaming data using finite memory, the computer program product comprising a computer readable storage medium having program instructions embodied therewith, the program instructions executable by a processor to cause the processor to: configure a number of data points required in a sample of incoming streaming data; and provide memory slots in a memory reservoir for the number of data points, with the memory slots each configured to store a position index and signal data pair for a data point, and each memory slot having a filtering thread configured to determine whether an index and signal data pair of the incoming streaming data should be stored in the memory slot; wherein the filtering threads are configured to dynamically repopulate the memory slots for the number of data points with index and signal data pairs at increasing arrival intervals in the stream of streaming data as the incoming streaming data arrives.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system of dynamic sampling of streaming data are provided in which samples of incoming streaming data taken at a set number of data points are stored in a finite memory reservoir in a dynamic manner such that, at any given time, the interval between samples of the streaming data is the same.

The stored sample data provides a set number of samples across intervals of the duration of the data stream, such that the intervals increase as the duration of the data stream increases, and the samples are spread uniformly through the duration of the data stream. The increasing intervals may have an increasing numbers of intermediary data points.

The method stores data points which are equidistant, rather than all data points in real-time as they happen. In this way the shape or graph of the data can be preserved, as the sample comprises data points which may be evenly distributed throughout the data stream.

Figure 1:
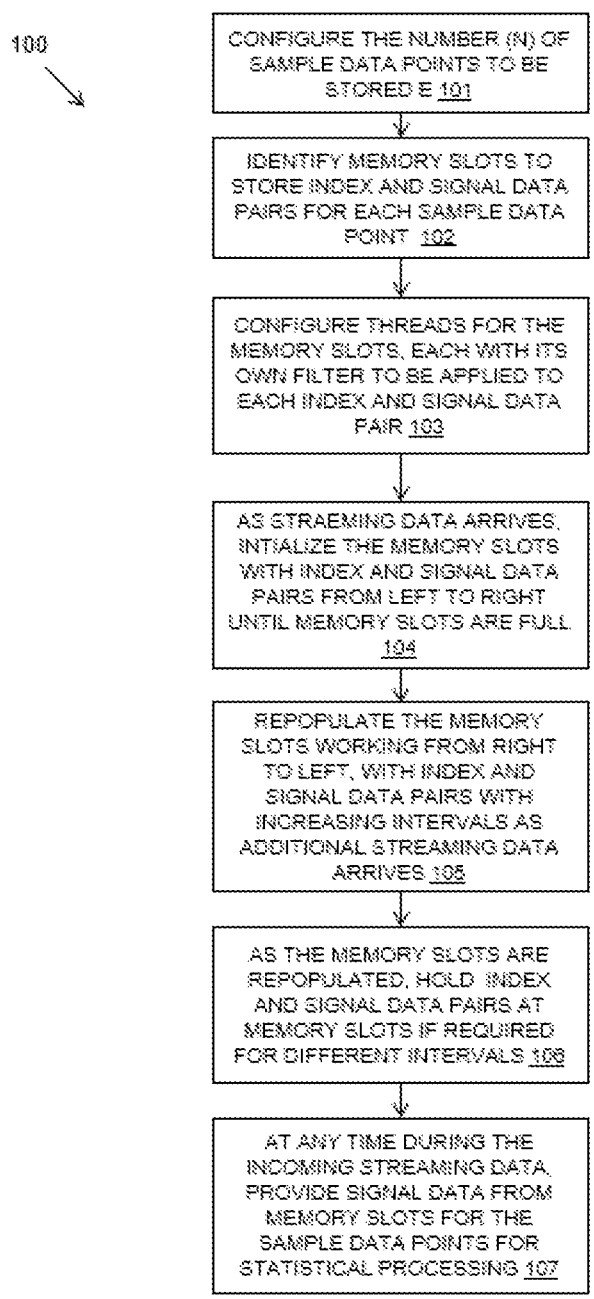
FIG. 1 is a flow diagram of an example embodiment of a method in accordance with the present invention.

Referring to FIG. 1, a flow diagram 100 shows an example embodiment of the described method of dynamic sampling of streaming data.

The method may first configure the streaming data process by configuring the number (N) 101 of sample data points to be stored in the finite reservoir and to identify 102 memory slots to store index and signal data pairs for each sample data point (2*N slots).

The method may configure 103 threads for each sample data point (N threads) including a master thread, and the remaining threads each having a filter to determine whether or not to store signal data from an indexed data point in its corresponding memory slot. The filters result in an adjusting of the intervals between the indexed data points that are stored with their signal data as the streaming data arrives.

As the streaming data arrives, the memory slots for the sample data points are initialized 104 with indexed data points and their signal data. During the initialization stage, the memory slots are populated from the master thread to the next thread, with memory slots initializing with increasing indices. Therefore, memory slots with lower indices initialize before higher indices; i.e., if the master thread is at the left, in a left to right manner.

Once the memory slots are full of indexed data points and their signal data, the sample data points are repopulated 105 into the memory slots with increasing intervals between the indexed data points that are stored with their signal data in the memory slots. During the repopulation stage, the memory slots are repopulated in the opposite direction compared to the initialization stage, with memory slots being repopulated with decreasing indices. Therefore, memory slots with higher indices repopulate before lower indices; i.e., from right to left.

In order to maintain indexed data points and their signal data that may be required as the signal data is repopulated to different intervals, each thread may hold 106 indexed data points and signal data value pairs at an additional memory slot that may be required in a subsequent repopulation.

At any time during the incoming streaming data, the signal data stored at the memory slots of the sample data points may be provided 107 to routines to provide statistical processing including summaries of the streaming data, where the sample signal data is uniformly spread through the received streaming data for shape preservation. In particular, routines that require shape preservation may process the sample data, for example, for the calculation of fractal dimension of the signal.

This provides a mechanism for storing a finite reservoir of samples from streaming data such that at any given time the distances between the samples are as uniform as possible.

Using the method it is possible to execute a random reservoir of samples of a signal from a streaming data source and to preserve the shape of the curve over a period of time with a finite amount of memory.

Overall, this scheme uses a finite amount of memory and the values are approximately equally spread from the given starting point. The process may be enhanced by having a finite memory for each thread.

Figure 2:
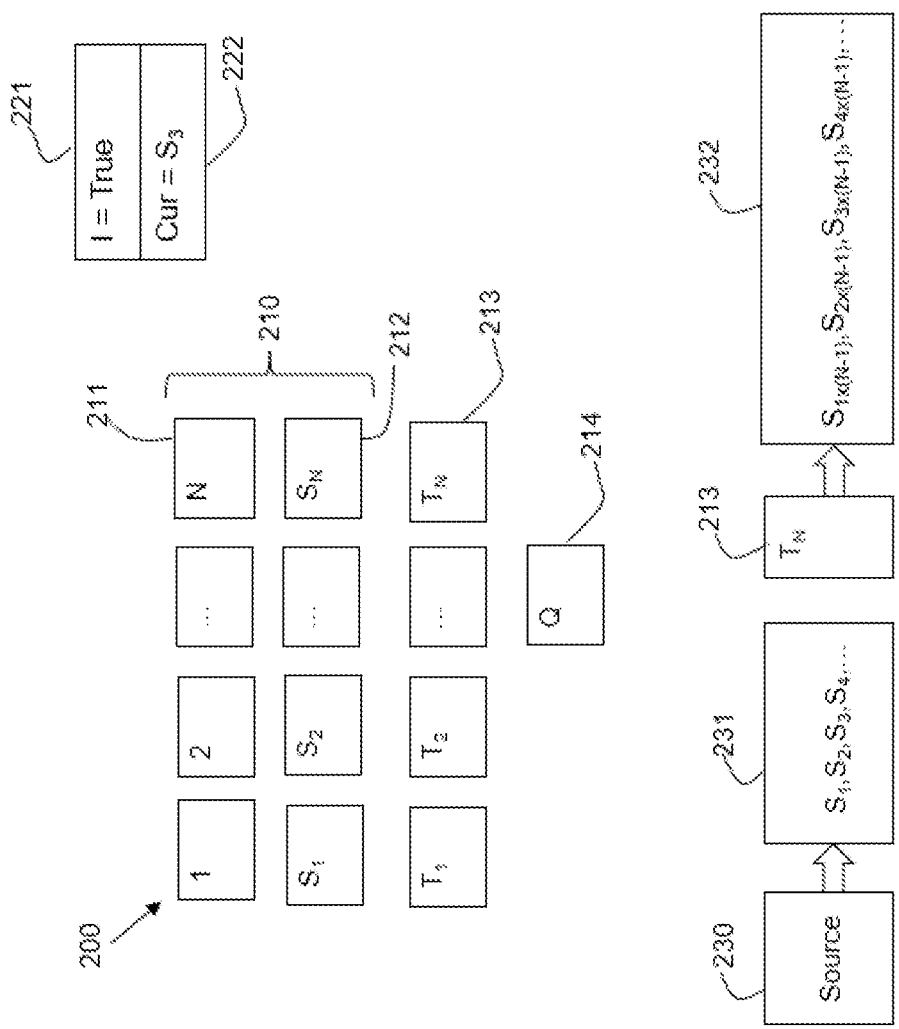
FIG. 2 is a schematic diagram of an example embodiment of a memory structure as used in a method in accordance with the present invention.

Referring to FIG. 2, a schematic diagram shows an example implementation of a reservoir 200 of finite memory for storing data from dynamic sample datapoints. The reservoir 200 is provided with memory slots 210 for the sample data points of the streaming data. The memory slots 210 for each data point store an index 211 and signal data 212. For each data slot 210 there is a thread 213 providing a filter for the data stored in the memory slots 210 based on the index 211. There is a temporary storage queue 214, which may be provided by an additional memory slot, to hold earlier filtered and stored index and signal data pair values that are not stored at the memory slots 210 and may be required when repopulating the memory slots 210.

A memory location 221 'I' is provided that can take a Boolean value of either "True" or "False" to indicate if the reservoir is initializing. This value is defaulted to "True" and it is turned to "False" when all the memory slots 210 are initialized with a value. A further memory location 222 may hold the current signal value 222.

A rigorous definition of streaming data 231 of a source 230 may be:

$S = \{S_1, S_2, \ldots, S_n | \forall i,j \in N, S_i \text{ is earlier than } S_j \exists i < j\}$ The method may initialize the same number of threads 213 as sample data points: $T_1, T_2, \ldots, T_N$. Each thread implements a filter such that the Source 230 $S_1, S_2, S_3, S_4, \ldots$ filtered by $T_N$, becomes a filtered data stream 232: $S_{1\times(N-1)}, S_{2\times(N-1)}, S_{3\times(N-1)}, S_{4\times(N-1)}, \ldots$.

Figure 3A:
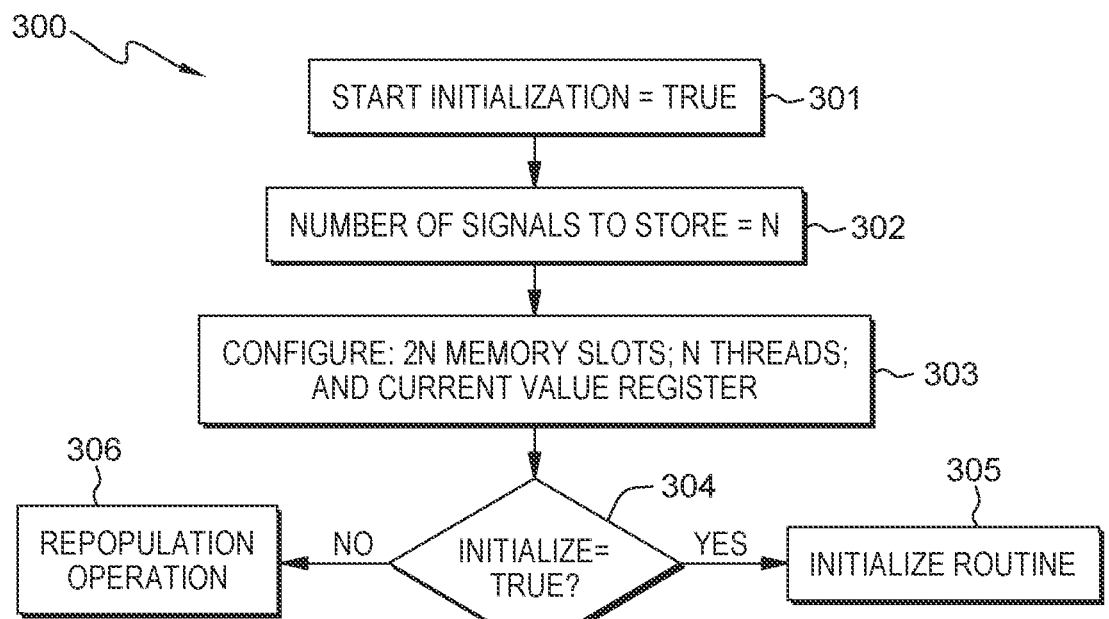
FIGS. 3A, 3B and 3C are flow diagrams of aspects of another example embodiment of a method in accordance with the present invention.
Figure 3B:
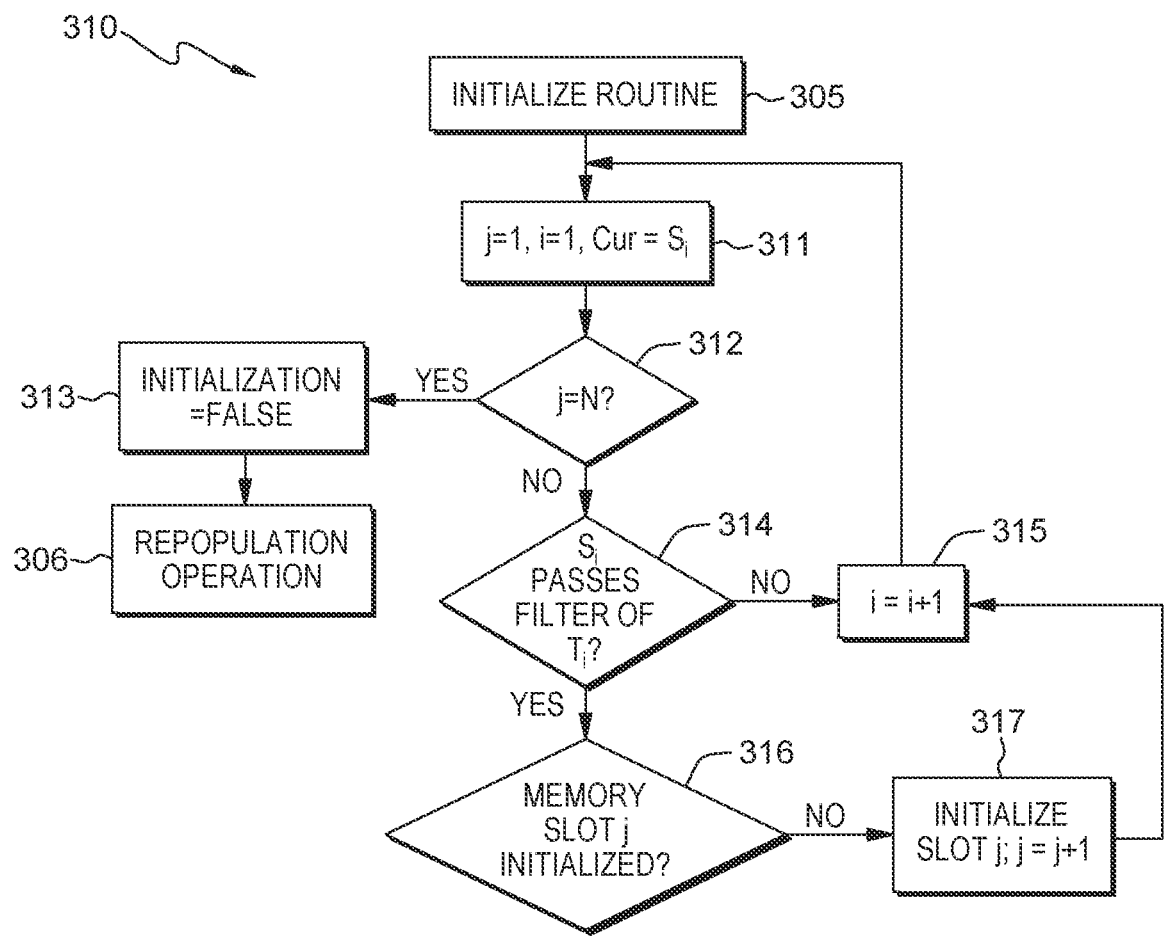
Figure 3C:
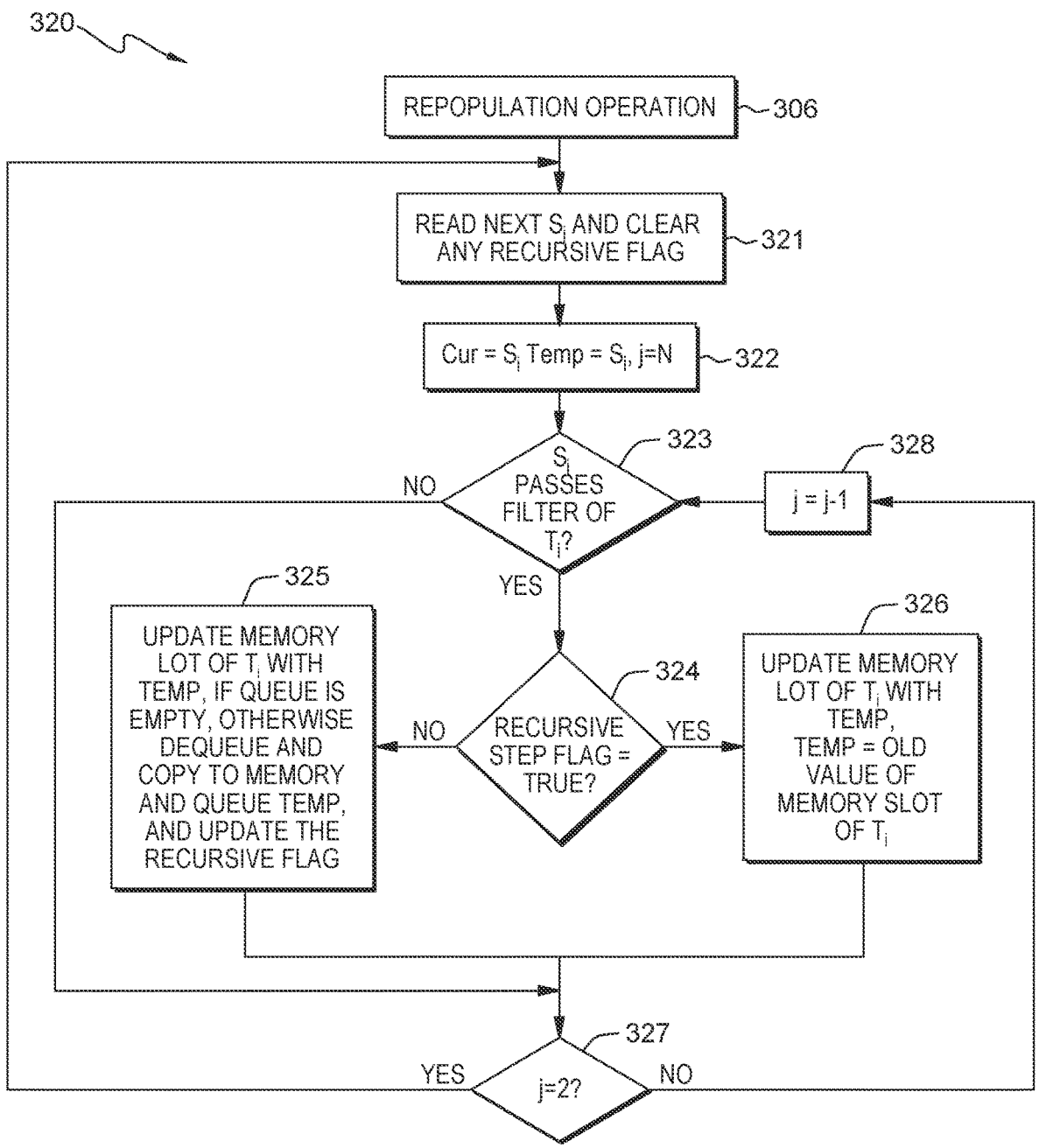

Referring to FIGS. 3A, 3B and 3C, flow diagrams 300, 310, 320 show stages of an example embodiment of the described method of FIG. 1.

In FIG. 3A, the method may start 301 with the initialization memory location value set to "True". The method may configure 302 a reservoir for a first N data points. The method may configure 303 2*N memory slots in the reservoir (N memory locations to store indexes of data points and the other set of N memory locations to store the actual signal data), N threads, and a current value register.

The method determines 304 if the initialization memory location value continues to be "True". If so, an initialize routine 305 is carried out as described in relation to FIG. 3B to initially fill the memory slots of the reservoir. Once the memory slots are full of data, the initialization memory location value is changed to "False" and a repopulation operation 306 as described in relation to FIG. 3C to add later data point samples and shift the existing data point samples to the left in the memory slots is carried out.

Referring to FIG. 3B, a flow diagram 310 shows the initialize routine 305. Initially 311, memory slots j and i are j=1 and i=1 where j is the highest number of the populated memory slot, where Current signal is $S_1$.

It is determined 312 if j=N, meaning that the memory slots are full of data. If j does not equal N, indicating that the memory slots are not yet full, it is determined 314 if the signal $S_i$ passes the filter of $T_i$. If $S_i$ does not pass the filter, i is incremented 315 and the method loops to evaluate the next current signal $S_i$ 311.

If $S_i$ does pass the filter, it is determined 316 if the memory slot j is initialized. If it is not initialized, memory slot j is initialized 317 and j is incremented. The method may then increment i 315 and loop to the next current signal $S_i$ 311.

If it is determined 312 that j=N, this indicates that the memory slots are full and the initialization memory location value is changed 313 to "False" and the repopulation operation 306 of data in the reservoir is carried out as described in relation to FIG. 3C.

Referring to FIG. 3C, the flow diagram 320 shows the repopulation operation 306 that is carried out once all the memory slots are all populated with data in them.

The method reads 321 the next $S_i$ and clears any recursive flag, with 322 the current signal $S_i$, a temporary signal $S_j$, and j=N meaning that the memory slots are all populated.

It is determined 323 if $S_i$ passes the filter of thread $T_j$. If so, it is determined 324 if a recursive step flag is "True". If it is "True", the memory slot of $T_j$ is updated 325 with the temporary value if the queue is empty, otherwise the queued value is dequeued and copied to the memory slot and the temporary value is queued and the recursive flag is set. If it is determined 324 that the recursive flag is not "True", the memory slot of $T_j$ is updated 326 with the temporary value and the temporary value is updated with the old value of the memory slot of $T_j$.

In both instances, it is then determined 327 if j=2, meaning that there are no more threads to filter. If j does not equal 2, the method increments 328 j=j+1 and it is determined 323 if the signal $S_i$ passes the filter of $T_j$. Once j=2, the method loops to read the next $S_1$ 321.

Whenever a thread's filter allows a signal to pass, if its corresponding memory slot is initiated, the filter just copies that signal into the memory slot. Otherwise, the filter passes the existing values in the memory slot to threads on its left, recursively pausing at each stage to get an acknowledgement that its processing is finished. The order of processing is from right to left, i.e., $T_x$ processes the signal ahead of $T_y$ whenever x>y.

The following is an example implementation of the method. It is determined from the user, a number of sample data points N, which is the number of samples to be stored. Initialize 2N memory locations and N threads such that for every x∈{1, 2, ..., N}, $(I_x, S_x)$ are the memory locations and Tx is the set of N threads.

Of the N threads, one thread is designated the master thread and designates itself with a Label 1 (henceforth designated $T_1$) and stores 1 in its index memory. The master thread initiates (N-1) worker threads each with a successively higher index number. Each of the threads (except the master thread) initiates a filter that only lets n*(L-1), where n is any whole number and L is its label. Each thread also initiates a scratch pad with 2*(N-L) memory locations which is organized as a queue.

For a given data stream the first signal seen by the master is designated as Signal 1 and a transformed data $(1, S_1)$ is written into one of the pair of 2N memory slots. This is immutable and is the starting point for spacing the data points.

Each subsequent signal the master thread sees i.e. $(2, S_2)$, $(3, S_3)$, ..., $(i, S_i)$, ... are written into an internal queue. Each worker thread takes each of the pair of values from the queue and applies the filter function to the first value in the pair (which is the index).

Each thread is also initialized with a filter $F_x$ such that it will only let those signals $S_n$ such that n mod (x-1)=0 where n is the nth signal. The only exception is the Thread $T_1$ which will only retain the first signal $S_1$ seen by the system, i.e., $T_2$ will let every signal through, $T_3$ will let every second signal through and $T_4$ will let every third signal through and so on.

The first signal $S_1$ is copied by the master thread $T_1$ into its own memory and it is immutable. With every subsequent signal, the master thread first checks if the flag 'I' is set to "True" and if so, the master thread will hand the subsequent signals over to its children in the order of its labels until the memory slots are initialized. Each of the threads will first check if its slot of memory is initialized and, if not, will apply the filter and if the index passes the filter, the value is copied into its memory location. If its slot of memory is initialized already, then it just saves the value in an internal queue. The master thread then checks if all the memory slots are initialized and if it is will turn the flag 'I' to "False". The queue has two operations $Q(T_i)$ and $DQ(T_i)$. $Q(T_i)$ (value) will store the value at the tail of the queue. $X=DQ(T_i)$ will remove the value at the head of the queue.

The exception for saving values is with two threads, the master thread $T_1$ and the thread $T_2$, which does not need to remember since the next value it needs to assume will be passed to it by $T_3$. Every subsequent signal is processed from the $T_N$, $T_{N-1}$, $T_{N-2}$, ..., $T_2$.

If a signal passes the filter for a thread $T_x$, and the current value ($V_x$) for $T_x$ needs to be replaced, $V_x$ is passed to $T_{x-1}$. This is done recursively until either for any given thread $T_y$, the value $V_y$ passed to it is either smaller than the max value stored in its queue or, if the current thread is $T_2$, if the $V_y$ passes its filter. If the value passed to a thread is smaller than the max value in the queue, the dequeue function is called upon and the max value is written to its memory slot, passing the current value of the thread stored in its memory location to the thread indexed one less than its current index.

If the value passes the filter but it is not passed to it from the thread with a higher index, the value is pushed into its queue.

At any given instance a function FO returns the set of values in memory slots $M_1, M_2, ..., M_N$ if the current value is $M_N$ or the set of values $M_1, M_2, ..., M_N, M_{max}$ that are all equally spaced and preserve the shape of the curve.

The above is an example of one method to achieve equally spaced samples from a streaming data source without remembering all the values from the source.

Figure 4A:
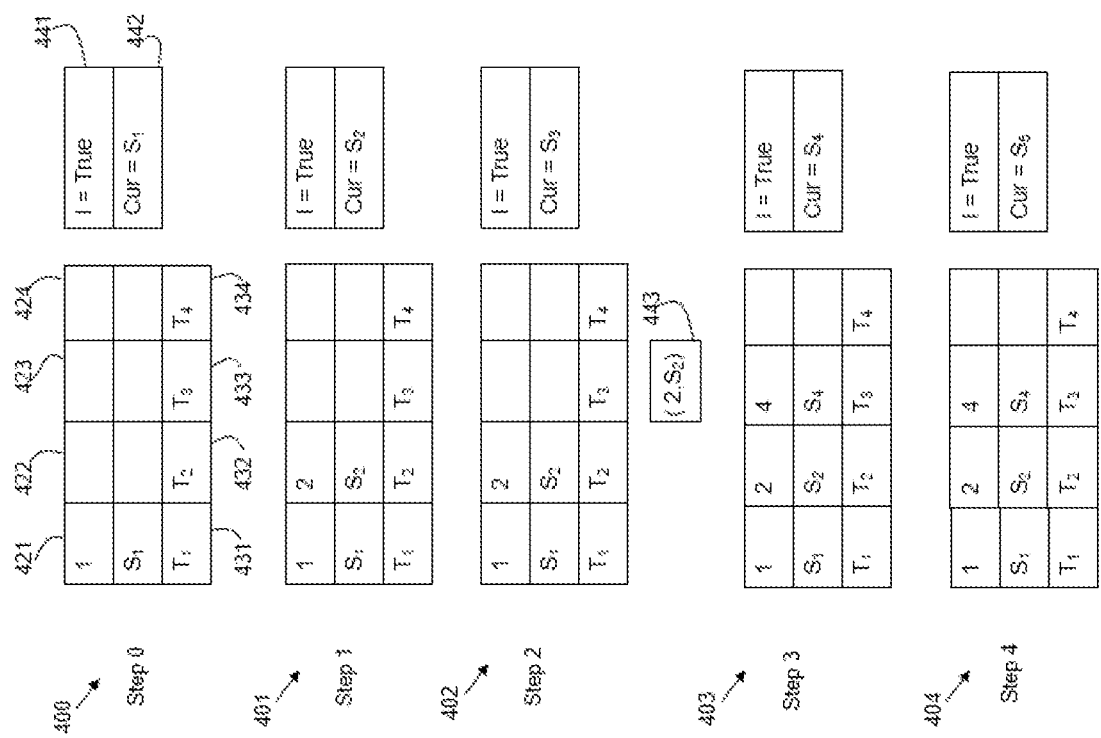
FIGS. 4A, 4B and 4C show a series of inputs into the memory structure of FIG. 2 illustrating an example embodiment of the described method.
Figure 4B:
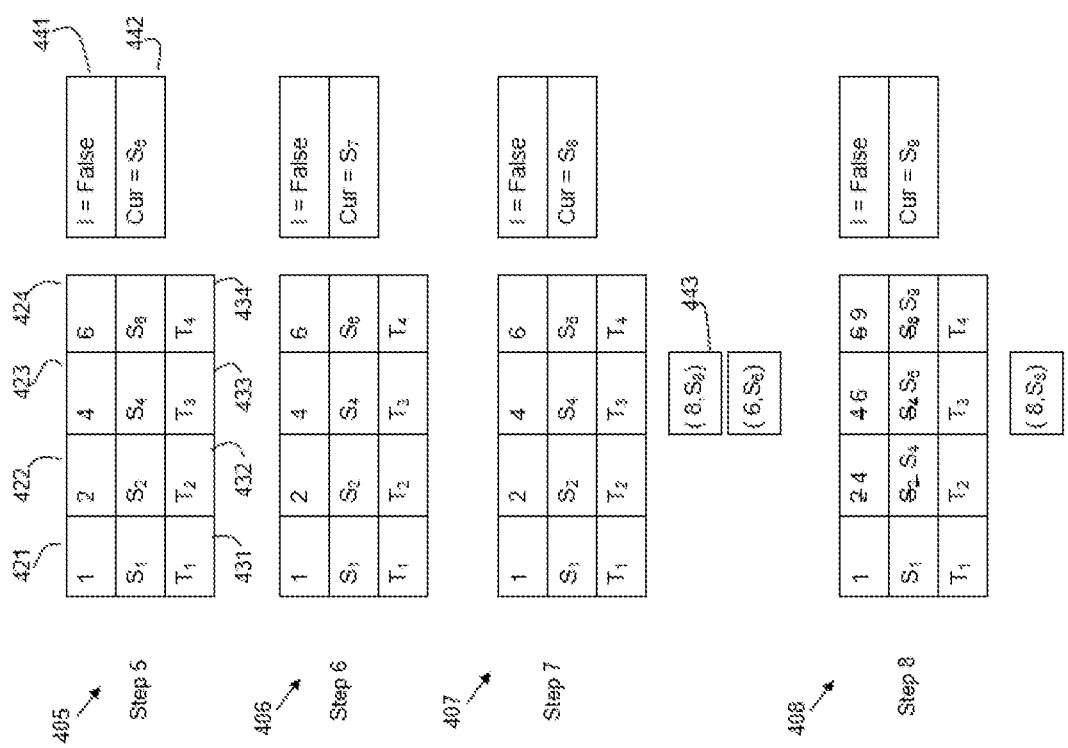
Figure 4C:
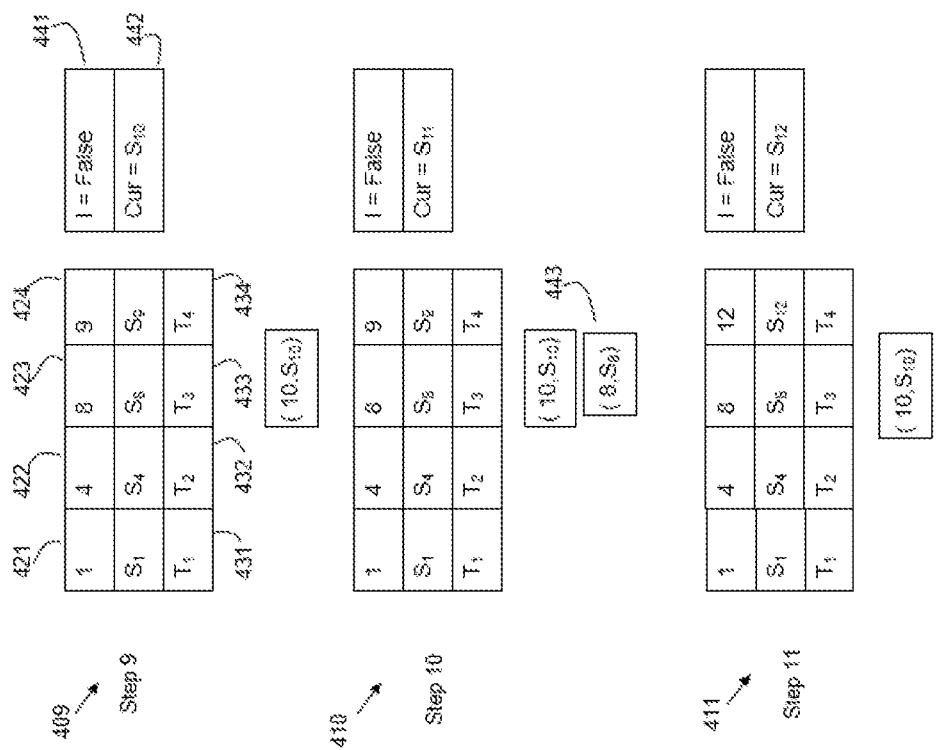

Referring to FIGS. 4A, 4B and 4C an example of a series of inputs into the memory structure of FIG. 2 are shown as steps to select samples from the incoming streaming data. A memory reservoir is shown in a simplified form with four memory slots 421-424 for index, signal data pairs, with four corresponding threads 431-434 including a master thread 431. An initialization memory location 441 provides a flag to show if the memory reservoir is in its initialization phase and a current memory location 442 holds the incoming current signal data value. A queue is provided 443 to hold values that may be required when repopulating the memory slots 422-424.

FIG. 4A shows the steps 0 to 4 400-404 during the initialization stage during which the memory slots are initially populated from left to right. FIGS. 4B and 4C show the steps 5 to 11 405-411 of repopulating the memory slots from right to left.

Referring to FIG. 4A, step 0 400 shows the master thread $T_1$ 431 populating the first memory slot 421 with values (1, $S_1$) and these values are immutable during the initialization and repopulating phases. At step 1, 401, the second thread $T_2$ 432 populates the second memory slot 421 with values (2, $S_2$). The second thread $T_2$ 432 filters to allow values that are multiples of (2-1), i.e., 1, so as to allow any value. At step 2, 402, the third thread $T_3$ 433 filters and queues 443 the values (2, $S_2$). In this instance, the queued value will not be used, as it is already stored in the second memory slot 421; however, queuing this value keeps the algorithm simpler.

At step 3, 403, the third thread $T_3$ 433 filters and populates the third memory slot 423 with values (4, $S_4$) and dequeues the queued values 443. At step 4, 404, the fourth thread $T_4$ 434 filters the current value.

In this way the initialization stage populates the memory slots in increasing order of indices from left to right.

Referring to FIG. 4B, at step 5, 405, the fourth thread $T_4$ 434 is populated with the current values (6, $S_6$) and the initialization memory location 441 is set to "False" as all the memory slots are now populated. The repopulation stage repopulates the memory slots in decreasing order of indices from right to left.

At step 6, 406, the fourth thread $T_4$ 434 continues to filter the current values and at step 7, 407, queues 443 values that do not meet the filter for the fourth thread for later use. At step 8, 408, the memory slot values are repopulated by shifting the values to the left using the queued values.

Referring to FIG. 4C, step 9, 409, step 10, 410, and step 11, 411 continue the processing repopulating the memory slots using the thread filters so that by step 11, 411 the stored data points are of $(1, S_1), (4, S_4), (8, S_8), (12, S_{12})$ which are uniformly spread through the data stream.

An example application of the described dynamic sample of data points from streaming data is for detecting that a machine is likely to fail. Such failure can be predicted by observing signals from the machine at various times. The sample data gives a measure of the "shape of the curve" of the streaming data as the sample data points are spread at intervals through the streaming data. It is therefore possible to determine the Fractal Dimension of the "shape of the curve" and to classify the "degree of the chaos" that is used to predict a failure of a machine.

Figure 5:
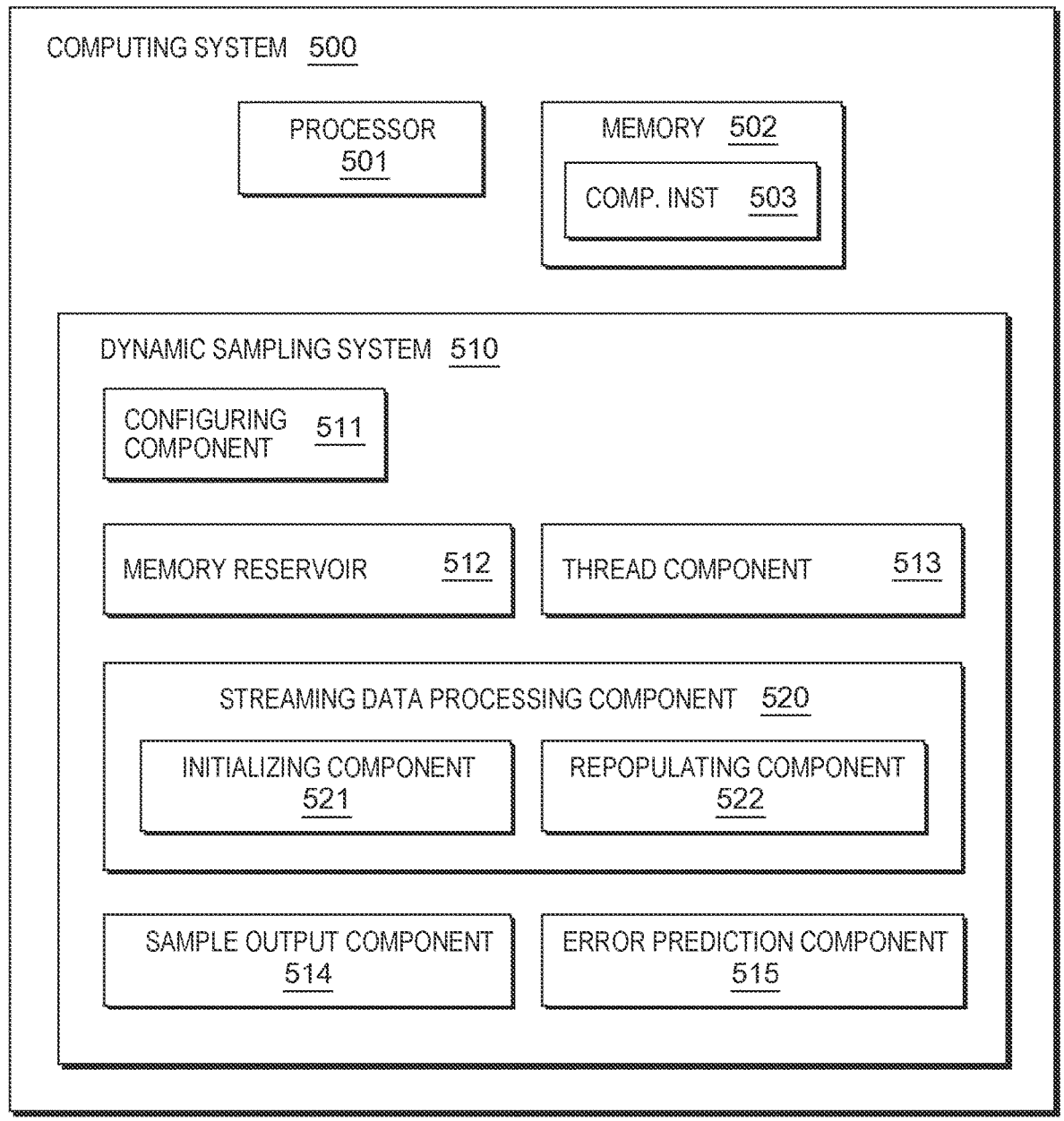
FIG. 5 is block diagram of an example embodiment of a system in accordance with the present invention.

Referring to FIG. 5, a block diagram shows an example embodiment of a computing system 500 on which a dynamic sampling system 510 may be implemented.

The computing system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The dynamic sampling system 510 includes a memory reservoir 512 for providing memory slots for a configured number of data points, with the memory slots each configured to store a position index and signal data pair for a data point and a configuring component 511 for configuring the number of data points required in a sample of incoming streaming data.

The dynamic sampling system 510 includes a thread component 513 for providing a filtering thread for each memory slot in the memory reservoir 512. The filtering threads each have a filter configured to determine whether an index and signal data pair of the incoming streaming data should be stored in each memory slot. The thread component 513 may include a master thread that maintains a constant index and data signal pair.

The dynamic sampling system 510 includes a streaming data processing component 520 for receiving the incoming streaming data and dynamically repopulating the memory slots for the number of data points with index and signal data pairs at increasing arrival intervals in the stream of streaming data by applying the filtering thread components.

The streaming data processing component 520 may include an initializing component 521 for initializing the index and signal data pairs in the memory slots until the memory slots all contain data. The initializing component 521 may initialize the index and signal data pairs in the memory slots by applying the filtering threads for each successive memory slot as the streaming data arrives.

The streaming data processing component 520 may also include a repopulating component 522 for dynamically repopulating the memory slots by applying the filtering threads to add later data point samples and shift the existing data point samples to the left in the memory slots. The repopulating component 522 may include maintaining a queue memory slot for shifted data point samples to be available for repopulating memory slots when required.

The streaming data processing component 520 may also include a sample output component 514 for outputting, at any time during the arrival of the incoming streaming data, the signal data from the memory slots for statistical processing as sample data points maintaining a statistical curve of the streaming data, and an error prediction component 515 for predicting an error due to the statistically processed sample data points deviating from an expected statistical curve.

Figure 6:
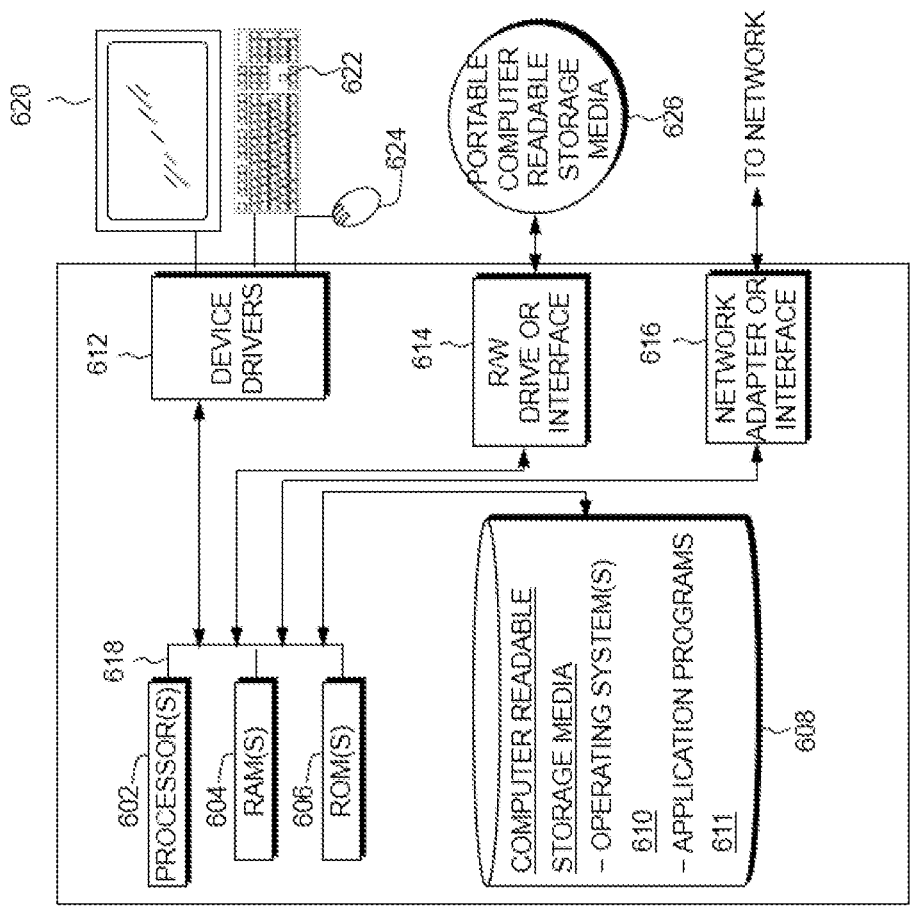
FIG. 6 is a block diagram of an embodiment of a computer system or cloud server in which the present invention may be implemented.

FIG. 6 depicts a block diagram of components of a computing system 500 as used for the dynamic sampling system 510, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
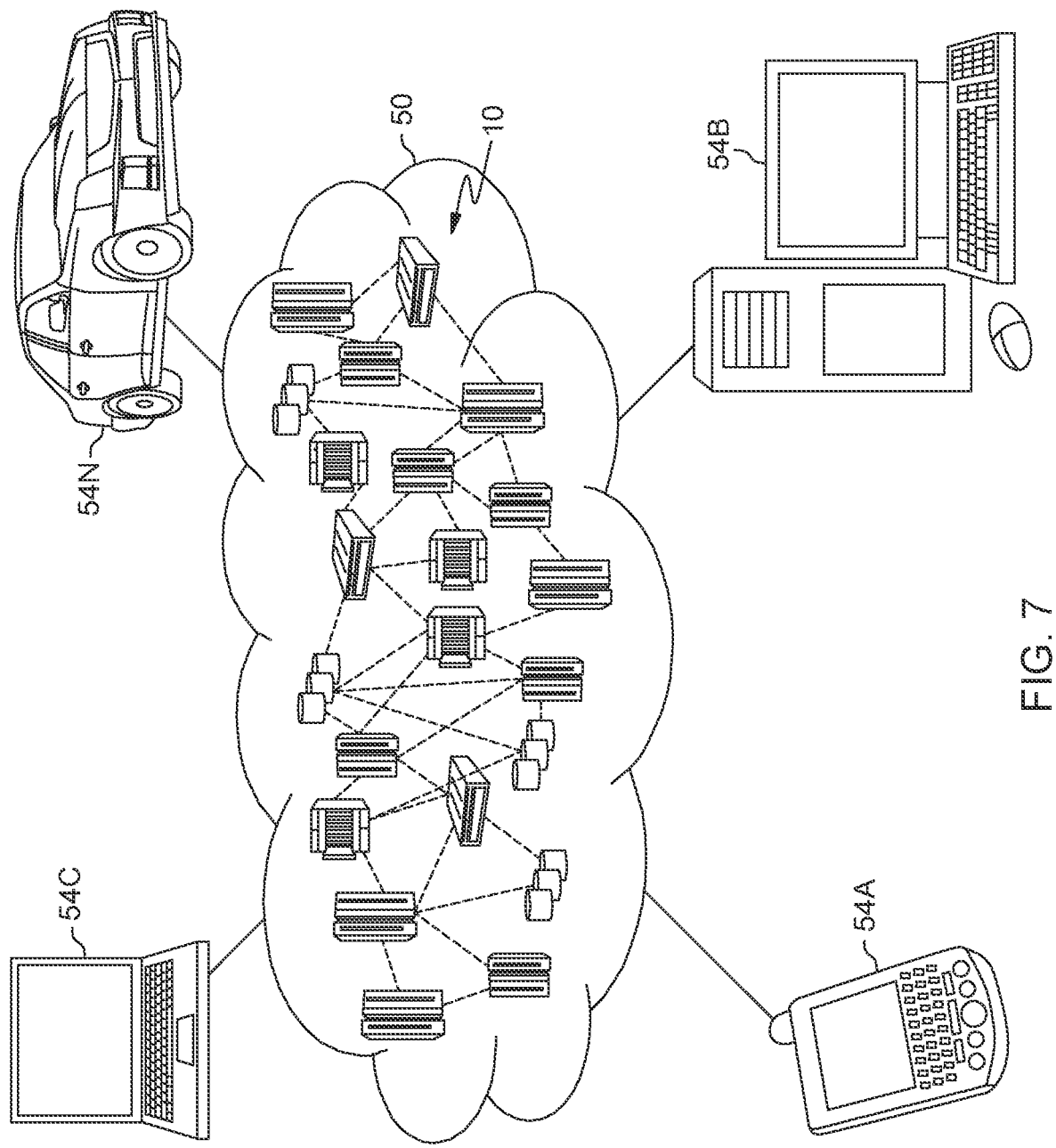
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
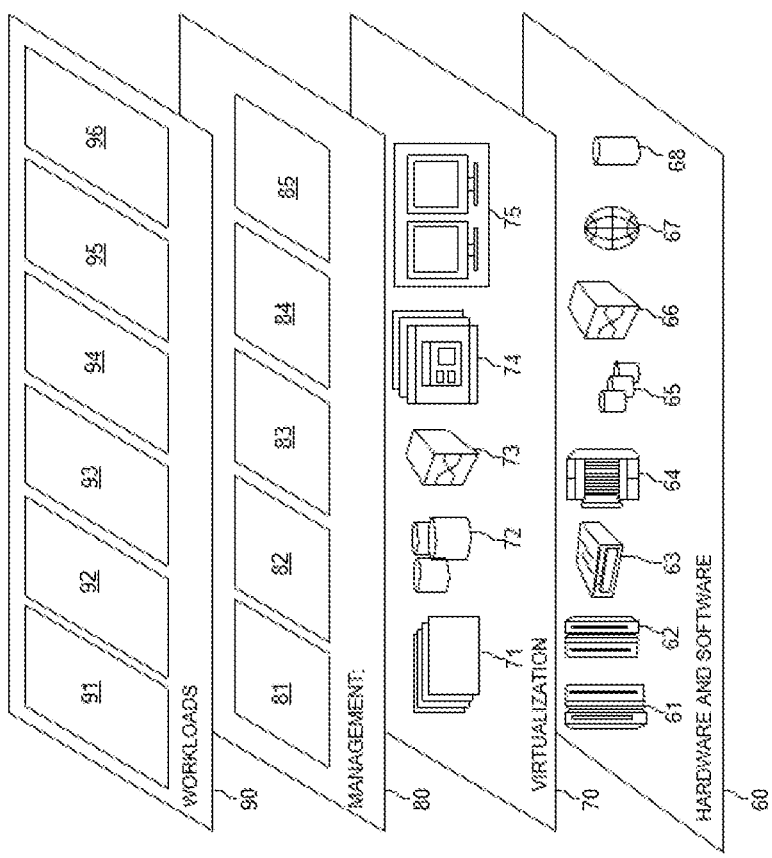
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and streaming data sampling processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for dynamic sampling of streaming data using finite memory, comprising:
   configuring a number of data points required in a sample of incoming streaming data; and
   providing memory slots in a memory reservoir for the number of data points, wherein a number of the memory slots is twice the configured number of data points set by a user, with the memory slots each configured to store a position index and signal data pair for a data point, wherein the position index is located directly above the signal data to which the position index corresponds, and each memory slot other than a first memory slot containing a master thread having a filtering thread, wherein the filtering thread is initiated by the master thread and is configured to determine whether an index and signal data pair of the incoming streaming data should be stored in the memory slot;
   wherein the filtering threads are configured to dynamically repopulate the memory slots in reverse order to an order in which the determination is made for the number of data points with index and signal data pairs at increasing arrival intervals in the stream of streaming data as the incoming streaming data arrives.

2. The method as claimed in claim 1, wherein at any time during an arrival of the incoming streaming data, the stored number of data points provides sample data points spread across a duration of the streaming data.

3. The method as claimed in claim 1, wherein the filtering threads for each memory slot each apply a filter to the index with an increasingly higher filter value for the index for later memory slots.

4. The method as claimed in claim 1, including initializing the memory slots with the index and signal data pairs until the memory slots all contain data, thereafter dynamically repopulating the memory slots by applying the filtering threads to add later data point samples and shift the existing data point samples to earlier indexed memory slots.

5. The method as claimed in claim 4, wherein initializing the memory slots applies the filtering threads for each successive memory slot as the streaming data arrives with increasing indices and repopulating the memory slots applies the filtering threads with decreasing indices.

6. The method as claimed in claim 1, including the master thread that maintains an immutable index and data signal pair.

7. The method as claimed in claim 4, wherein repopulating the memory slots includes maintaining a queue of data point samples to be available for repopulating lower index memory slots when required.

8. The method as claimed in claim 1, wherein each thread implements a filter such that a source signal data stream $S_1$, $S_2$, $S_3$, $S_4$, ... filtered by $T_N$, becomes a filtered data stream $S_{1 \times (N-1)}$, $S_{2 \times (N-1)}$, $S_{3 \times (N-1)}$, $S_{4 \times (N-1)}$, ... where there are N memory slots.

9. The method as claimed in claim 1, wherein at any time during an arrival of the incoming streaming data, the signal data from the memory slots is provided for statistical processing as sample data points maintaining a statistical curve of the streaming data.

10. The method as claimed in claim 9, including predicting an error due to the statistically processed sample data points deviating from an expected statistical curve.

11. A system for dynamic sampling of streaming data using finite memory, comprising:
a processor and a memory configured to provide computer program instructions to the processor to execute the function of the components:
a configuring component for configuring a number of data points required in a sample of incoming streaming data; and
a memory reservoir for providing memory slots for the number of data points, wherein a number of the memory slots is twice the configured number of data points set by a user, with the memory slots each configured to store a position index and signal data pair for a data point, wherein the position index is located directly above the signal data to which the position index corresponds, with the memory slots each configured to store a position index and signal data pair for a data point;
a thread component for providing a filtering thread for each memory slot other than a first memory slot containing a master thread, the filtering threads each having a filter initiated by the master thread configured to determine whether an index and signal data pair of the incoming streaming data should be stored in the memory slot; and
a streaming data processing component for receiving the incoming streaming data and dynamically repopulating the memory slots in reverse order to an order in which the determination is made for the number of data points with index and signal data pairs at increasing arrival intervals in the stream of streaming data by applying the filtering thread components.

12. The system as claimed in claim 11, wherein the thread component provides filtering threads for each memory slot for applying a filter to the index with an increasingly high filter value for the index for later memory slots.

13. The system as claimed in claim 11, wherein the streaming data processing component includes:
an initializing component for initializing the memory slots with the index and signal data pairs until the memory slots all contain data; and
a repopulating component for thereafter dynamically repopulating the memory slots by applying the filtering threads to add later data point samples and shift the existing data point samples to earlier indexed memory slots.

14. The system as claimed in claim 13, wherein the initializing component for initializing the memory slots applies the filtering threads for each successive memory slot as the streaming data arrives.

15. The system as claimed in claim 11, wherein the thread component includes the master thread that maintains a constant index and data signal pair.

16. The system as claimed in claim 13, wherein the repopulating component includes maintaining a queue of data point samples to be available for repopulating lower index memory slots when required.

17. The system as claimed in claim 11, wherein the thread component provides filtering threads such that a source signal data stream $S_1$, $S_2$, $S_3$, $S_4$, ... filtered by $T_N$, becomes a filtered data stream $S_{1 \times (N-1)}$, $S_{2 \times (N-1)}$, $S_{3 \times (N-1)}$, $S_{4 \times (N-1)}$, ... where there are N memory slots.

18. The system as claimed in claim 11, including a sample output component for outputting, at any time during an arrival of the incoming streaming data, the signal data from the memory slots for statistical processing as sample data points maintaining a statistical curve of the streaming data.

19. The system as claimed in claim 18, including an error prediction component for predicting an error due to the statistically processed sample data points deviating from an expected statistical curve.

20. A computer program product for dynamic sampling of streaming data using finite memory, the computer program product comprising a computer readable storage medium having program instructions embodied therewith, the program instructions executable by a processor to cause the processor to:
configure a number of data points required in a sample of incoming streaming data; and
provide memory slots in a memory reservoir for the number of data points, wherein a number of the memory slots is twice the configured number of data points set by a user, with the memory slots each configured to store a position index and signal data pair for a data point, wherein the position index is located directly above the signal data to which the position index corresponds, and each memory slot other than a first memory slot containing a master thread having a filtering thread, wherein the filtering thread is initiated by the master thread and is configured to determine whether an index and signal data pair of the incoming streaming data should be stored in the memory slot;
wherein the filtering threads are configured to dynamically repopulate the memory slots in reverse order to an order in which the determination is made for the number of data points with index and signal data pairs at increasing arrival intervals in the stream of streaming data as the incoming streaming data arrives.

* * * * *